United States Patent Office  3,498,841
Patented Mar. 3, 1970

3,498,841
PROCESS OF TREATING CELLULOSIC MEMBRANE AND ALKALINE WITH MEMBRANE SEPARATOR
Howard Eugene Hoyt and Helmuth Louis Pfluger, Huntingdon Valley, Pa., assignors to Borden, Inc., New York, N.Y., a corporation of New Jersey
No Drawing. Filed Nov. 2, 1967, Ser. No. 680,048
Int. Cl. H01m 35/02, 3/02
U.S. Cl. 136—6                                                      10 Claims

ABSTRACT OF THE DISCLOSURE

This invention relates to the improvement of water-soluble cellulose ether membrane for use as separators in concentrated alkaline battery cells by contacting said membrane with an aqueous alkali solution of concentration less than that of the alkali solution to be used in the battery but above that at which the membrane is soluble therein.

ORIGIN OF THE INVENTION

The invention described herein was made in the performance of work under a NASA contract and is subject to the provisions of Section 305 of the National Aeronautics and Space Act of 1958, Public Law 85–568 (73 Stat. 435; 42 U.S.C. 2457).

BACKGROUND OF THE INVENTION

It is known that the cycle life of rechargeable battery cells is limited by the tendency of the electrodes to short circuit and that this tendency can be slowed down by the use of a separator membrane between the electrodes. In the particular case of alkaline silver-zinc cells, such a separator must also withstand the oxidizing power of silver oxide and the penetration of metallic zinc, but must also have low resistance to the passage of an electrolytic current. Films of cellulose ethers, particularly methyl cellulose, have excellent withstanding powers against both silver oxidation and zinc metal penetration but not the low electrolytic resistance required; particularly in the 30 to 45% potassium hydroxide solution customarily required for efficient operation of silver-zinc, silver-cadmium and other alkaline batteries.

SUMMARY OF THE INVENTION

It has now been found that cellulose ether films may be made electrolytically conductive in concentrated alkaline battery solutions to provide battery separators with extended life and superior performance. Moreover, it has surprisingly been found that the resistance remains low for indefinite periods of time and does not revert to the high resistance it would have had if placed directly in 30–45% potassium hydroxide.

The present invention is directed to the process of increasing the electorlytic conductivity of a water-soluble cellulose ether membrane for concentrated alkaline batteries comprising contacting said membrane with an aqueous alkali solution of concentration less than that of the alkali solution in the battery but above that at which the membrane is soluble therein until the said membrane is essentially equilibrated and to the resulting stabilized membrane.

DETAILED DESCRIPTION

This invention may be applied to any water-soluble or water-swellable and alkali insoluble cellulose ether, such as methyl cellulose, ethyl cellulose, propyl cellulose, modified hydroxy ethyl cellulose, and mixtures thereof.

The preferred material is methyl cellulose, particularly methyl cellulose in which 1.6 to 1.9 out of every 3.0 available hydroxyl units of cellulose have been etherified.

Methods for etherifying cellulose to different degrees and using a variety of ether groups are known to the art and are not a subject of this patent application.

The film, or membrane, to be treated may also contain a minor proportion, up to 30%, of a modifying agent to help increase conductivity and/or increase flexibility. Examples are hydroxide bases of inorganic or organic cations, organic nitrogen bases, salts of organic acids, glycols, and polymeric acids.

Examples of hydroxide bases are potassium hydroxide, sodium hydroxide and tetramethylammonium hydroxide. Organic nitrogen bases that can be used include aliphatic primary, secondary and tertiary amines and hydroxy amines, in particular hydroxypropylamine and triethanolamine. Suitable salts of organic acids are the alkali metal salts of acetic, propionic, butyric, salicyclic, succinic, glutaric, maleic, and fumaric acids. Potassium salts are preferred when the cell electrolyte is to be potassium hydroxide. The glycol used can be, for example, glycerine, ethylene glycol, tetraethylene glycol, and the polyethylene glycols. As to polymeric acids, polyacrylic acid, such as Acrysol A5, and the 1:1 copolymer of vinyl methyl ether and maleic anhydride, such as Gantrez AN can be used.

The alkali used in the lower concentrated solutions may be aqueous solutions of the hydroxide of any alkali metal including the hydroxides of sodium, potassium, lithium, rubidium or cesium as well as the hydroxide of organic cations such as tetramethyl ammonium hydroxide. The preferred alkali is potassium hydroxide which is also the preferred alkali of commercial silver-zinc and silver-cadmium cells.

The concentration of potassium hydroxide used in this invention for the pre-soak is between about 10% to about 30% by weight, in water, but sufficiently high to avoid disintegration of the membrane. In preparation of straight methyl cellulose films for improved separator use in 30–45% potassium hydroxide solutions, it is preferred to use as presoaking solution a potassium hydroxide solution of concentration 13–17% by weight.

The membrane to be treated may be in the form of an electrode wrap as, for example, in the form known in the art as a U wrap. In a preferred application of this invention, the battery cell is first assembled with positive and negative electrodes properly separated by the membrane material. The assembled cell is next filled with the less concentrated presoaking alkali solution. Then after equilibration, the presoak solution is removed and replaced by electrolyte of the concentration at which the cell is expected to operate.

In carrying out this invention it is preferred that the presoak in less concentrated alkali be carried out at the same temperature at which the cell will eventually be operated after equilibration with the more concentrated alkali. However, a wide range of temperatures may be used. The membrane can be precooled to very low temperatures (below about 10° C.) in contact with the alkali solution.

As used herein, the term "stabilized" refers to the fact that the membranes will not revert to the conductivity levels that the membranes had before being processed in accordance with the present invention.

The invention will be further described in connection with the following examples which are set forth for the purpose of illustration only and wherein proportions are in parts by weight unless specifically stated to the contrary.

EXAMPLE 1

A 1.5 mil film of methyl cellulose was soaked in 15% KOH for three days, blotted, then stirred for seven days in a large excess of 45% KOH. The resistance of the film in 45% KOH was determined, the percent weight increase on the blotted film and the percent KOH in the blotted film by sulfate ash analysis. A control film of methyl cellulose was equilibrated directly in 45% KOH and analyzed in a similar manner. Results are shown in Table I:

TABLE I

| | Film pre-soaked in 15% KOH, then equilibrated in 45% KOH | Control film equilibrated directly in 45% KOH |
|---|---|---|
| Wt. increase, percent | 61.2 | 22.0 |
| KOH in blotted film by ash analysis, percent | 20.1 | 11.9 |
| KOH in blotted film, calculated, percent | 19.7 | 11.6 |
| Resistance, milliohms-in.$^2$ | 60 | 6,080 |

EXAMPLE 2

The procedure was repeated on a similar film except that after soaking in 15% KOH it was stirred for three days in 30% KOH. Electrolytic resistance, weight gain were then compared to values on the same film equilibrated directly in 30% KOH, as shown in Table II:

TABLE II

| | Film pre-soaked in 15% KOH, then equilibrated in 30% KOH | Control film equilibrated directly in 30% KOH |
|---|---|---|
| Wt. increase, percent | 64.9 | 25.0 |
| Resistance, milliohms-in.$^2$ | 17.3 | 498 |

EXAMPLE 3

Two methyl cellulose formulations with poly (vinyl methyl ether-maleic anhydride), two methyl cellulose formulations with polyacrylic acid and a methyl cellulose formulation with potassium acetate were cast as films. Clear, one-phase films were obtained of the compositions and designations shown:

C1: 10% PVMMA—90% methyl cellulose
C2: 20% PVMMA—80% methyl cellulose
B3.3: 33% PAA—67% methyl cellulose
B2: 20% PAA—80% methyl cellulose
KA: 25% KOAc—75% methyl cellulose The air dry films were soaked in 15% KOH overnight, then sample sections were soaked in 30% and 45% KOH respectively. The electrolytic resistances of the specimens thus processed are compared to the corresponding values obtained when the dry films were soaked directly in 30% and 45% KOH respectively.

TABLE III

| | Resistance, milliohms-in.$^2$ | | | | |
|---|---|---|---|---|---|
| | KA | C1 | C2 | B3.3 | B2 |
| Film soaked directly in 30% KOH | 20.0 | 72.8 | 22.4 | 23.9 | 24.3 |
| Film soaked in 15% KOH, then 30% KOH | 5.9 | 10.3 | 9.1 | 3.2 | 6.8 |
| Film soaked directly in 45% KOH | 54.0 | 905 | 738 | 474 | 958 |
| Film soaked in 15% KOH, then 45% KOH | 5.6 | 11.2 | 7.4 | 4.9 | 11.2 |

EXAMPLE 4

Uniform strips of 15 mm. width were cut for tensile testing, using PUDO cellophane and methyl cellulose. The methyl cellulose film strips were conditioned in 15% KOH, then in 30% KOH as in Example 2. One half the strips were removed and suspended in a bath of 30% KOH saturated with dissolved silver oxide for a period of 72 hours, under gentle stirring of the solution. The strips were then removed, blotted and immediately broken on a tensile testing machine. The breaking strength so obtained was compared with that found for the unoxidized strips.

For comparison, uniform strips of cellophane of 15 mm. width were cut. Half of these were stirred in a bath of 30% KOH and half were stirred in 30% KOH saturated with silver oxide. The breaking strength of the oxidized cellophane was then compared with that found for cellophane treated with KOH only. Results are shown in Table IV.

TABLE IV.—EFFECT OF SILVER OXIDE ON STRENGTH OF FILMS

| | Methyl Cellulose Modified as in Example 2 | PUDO Cellophane |
|---|---|---|
| Strength after 72 hours in 30% KOH only, p.s.i. (A) | 2340 | 1010 |
| Strength after 72 hours in 30% KOH +Ag$_2$O, p.s.i. (B) | 2130 | 148 |
| B/A | .904 | .143 |

The greater stability toward oxidizing action of the silver oxide normally present in the electrolyte of silver/zinc cells is readily apparent.

EXAMPLE 5

A series of equilibrations are made using the process and membrane of Example 1, with the exception that the low concentrated KOH solution therein used is replaced, separately and in turn, by an equal concentration of tetramethyl ammonium hydroxide, sodium hydroxide, lithium hydroxide, rubidium hydroxide, and cesium hydroxide. Membranes of increased conductivity are obtained in each instance as compared to membranes equilibrated directly in the battery alkali.

Although the exact mechanism of the invention is not known it has been observed that when cellulosic membranes are pre-swollen in dilute KOH, then equilibrated in KOH concentrations of 30% KOH or higher that the weight pickup of the stronger alkali is significantly greater than when the membrane is equilibrated directly in the stronger alkali. Furthermore, ash analysis on such membranes reveals a metal content corresponding to replacement of 15% electrolyte by electrolyte of the stronger concentration. It appears from this that the preconditioning of the film in dilute alkali according to the invention results in an increased free volume in the membrane for imbibition of strong electrolyte.

Membranes prepared by this procedure are markedly more resistant to oxidation than cellophane of prior art and hence can be used in oxidizing environments without losing their physical integrity.

It will be understood that it is intended to cover all changes and modifications of the examples of the invention herein chosen for the purpose of illustration which do not constitute departures from the spirit and scope of the invention.

What is claimed is:

1. A process for increasing the electrolytic conductivity of a water-soluble cellulose ether membrane when in contact with an aqueous solution A, said solution comprising an alkali hydroxide selected from the group consisting of potassium hydroxide, tetramethyl ammonium hydroxide, sodium hydroxide, lithium hydroxide, rubidium hydroxide and cesium hydroxide, the concentration of said alkali hydroxide being selected from the range between about 30% and about 45% by weight of said solution, said process comprising first contacting said membrane with an aqueous alkali hydroxide conditioning solution B of concentration less than the concentration selected for solution A but above that at which the membrane is soluble therein until the membrane is essentially equilibrated, then removing the conditioned membrane from said conditioning solution B and placing the conditioned membrane in the alkali hydroxide solution A having the selected concentration.

2. The process of claim 1 wherein the membrane is first interposed in the dry state between the electrodes of a battery cell, the conditioning with solution B is carried out in the battery cell, the removal of the conditioned membrane from solution B is effected by pouring solution B from the cell and solution A is then poured into the cell.

3. The process of claim 1 wherein the alkali used in both solution A and solution B is potassium hydroxide, the concentration of solution A being from about 30% to about 40% by weight and the concentration in the conditioning solution B being below 30% but above about 10%.

4. The process of claim 3 wherein the alkali conditioning solution B is an aqueous potassium hydroxide solution of concentration 13–17% by weight.

5. A cellulose ether membrane, suitable as a battery separator for alkaline electrochemical cells, conditioned and stabilized by the process of claim 1.

6. The membrane of claim 5 wherein the cellulose ether is methyl cellulose.

7. The membrane of claim 6 wherein the degree of substitution in the methyl cellulose is in the range of 1.6–1.9.

8. An alkaline electrochemical cell comprising electrodes, an aqueous alkali fluid comprising between about 30% and about 45% by weight of an alkali hydroxide selected from the group consisting of potassium hydroxide, tetramethyl ammonium hydroxide, sodium hydroxide, lithium hydroxide, rubidium hydroxide and cesium hydroxide, and the stabilized battery separator of claim 5.

9. An alkaline silver cell comprising electrodes, an aqueous alkali fluid comprising between about 30% and about 45% by weight of an alkali hydroxide selected from the group consisting of potassium hydroxide, tetramethyl ammonium hydroxide, sodium hydroxide, lithium hydroxide, rubidium hydroxide and cesium hydroxide, and the stabilized battery separator of claim 5.

10. An alkaline silver zinc cell comprising a silver electrode, a zinc electrode, an aqueous alkali fluid comprising between about 30% and about 45% by weight of an alkali hydroxide selected from the group consisting of potassium hydroxide, tetramethyl ammonium hydroxide, sodium hydroxide, lithium hydroxide, rubidium hydroxide and cesium hydroxide, and the stabilized battery separator of claim 7.

References Cited

UNITED STATES PATENTS

| | | | |
|---|---|---|---|
| 2,419,341 | 4/1947 | Edelstein | 106—197 XR |
| 2,696,515 | 12/1954 | Koren et al. | 136—154 XR |
| 3,245,839 | 4/1966 | Rosser et al. | 136—146 |

WINSTON A. DOUGLAS, Primary Examiner

DONALD L. WALTON, Assistant Examiner

U.S. Cl. X.R.

106—197; 136—148; 264—195